United States Patent
Liao et al.

(10) Patent No.: US 9,693,345 B2
(45) Date of Patent: Jun. 27, 2017

(54) FLEXIBLE RADIO LINK CONTROL PACKET DATA UNIT LENGTH

(71) Applicant: Telefonaktiebolaget L M Ericsson (publ), Stockholm (SE)

(72) Inventors: Min Liao, Beijing (CN); Anna Larmo, Espoo (FI); Peter Lundh, Skärholmen (SE); Szilveszter Nádas, Budapest (HU); Ina Widegren, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 49 days.

(21) Appl. No.: 14/198,089

(22) Filed: Mar. 5, 2014

(65) Prior Publication Data

US 2014/0247783 A1    Sep. 4, 2014

Related U.S. Application Data

(63) Continuation of application No. 12/525,852, filed as application No. PCT/SE2008/050016 on Jan. 7, 2008, now Pat. No. 8,767,633.

(30) Foreign Application Priority Data

Feb. 6, 2007  (SE) ...................................... 0700302

(51) Int. Cl.
*H04W 4/00* (2009.01)
*H04W 72/04* (2009.01)
(Continued)

(52) U.S. Cl.
CPC ..... *H04W 72/042* (2013.01); *H04W 72/1278* (2013.01); *H04W 72/1242* (2013.01); *H04W 88/08* (2013.01); *H04W 92/12* (2013.01)

(58) Field of Classification Search
CPC ...................................................... H04L 12/56
(Continued)

(56) References Cited

U.S. PATENT DOCUMENTS 6,339,705 B1    1/2002   Pehrson
2004/0009767 A1  1/2004   Lee et al.
(Continued)

FOREIGN PATENT DOCUMENTS

CN    1859037 A    11/2006
EP    1643690 A1   4/2006
(Continued)

OTHER PUBLICATIONS

3rd Generation Partnership Project. "Downlink and Uplink Channel Structures for HSDPA." TSTR!#17 (00)1381, TSG-RAN Working Group #1, Stockholm, Sweden, Nov. 21-24, 2000.
(Continued)

*Primary Examiner* — Shripal Khajuria
(74) *Attorney, Agent, or Firm* — Coats & Bennett, P.L.L.C.

(57) ABSTRACT

According to an example method performed in a High Speed Downlink Packet Access (HSDPA) environment, a first device generates a High Speed Downlink Shared Channel (HS-DSCH) data frame that includes a plurality of blocks of packet data units. A first block of the plurality of blocks includes packet data units of a first length, and a second block of the plurality of blocks includes packet data units of a different, second length. The first device transfers the HS-DSCH data frame to a second device. The HS-DSCH data frame further includes, for each block of the plurality of blocks, a first information element that indicates a length of the one or more packet data units in the each block, and a second information element that indicates a quantity of packet data units in the each block.

11 Claims, 13 Drawing Sheets

(51) Int. Cl.
*H04W 72/12* (2009.01)
*H04W 88/08* (2009.01)
*H04W 92/12* (2009.01)

(58) Field of Classification Search
USPC .......................................................... 370/329
See application file for complete search history.

(56) References Cited

U.S. PATENT DOCUMENTS

| | | | |
|---|---|---|---|
| 2004/0081181 | A1 | 4/2004 | Malkamaki |
| 2005/0207343 | A1* | 9/2005 | Han .................. H04W 28/10 370/235 |
| 2008/0002656 | A1 | 1/2008 | Lundh et al. |
| 2009/0129322 | A1 | 5/2009 | Suwa et al. |
| 2009/0180387 | A1 | 7/2009 | Chun et al. |
| 2014/0301399 | A1 | 10/2014 | Sarkkinen et al. |

FOREIGN PATENT DOCUMENTS

| | | |
|---|---|---|
| JP | 2001103093 A | 4/2001 |
| JP | 2005501494 A | 1/2005 |
| JP | 2005521360 A | 7/2005 |
| JP | 2006319940 A | 11/2006 |
| JP | 2010518699 A | 5/2010 |
| RU | 2274955 C2 | 4/2006 |
| WO | 03019960 A1 | 3/2003 |
| WO | 2006110021 A1 | 10/2006 |
| WO | 2008097544 A2 | 8/2008 |
| ZA | 200401396 A | 2/2004 |

OTHER PUBLICATIONS

3rd Generation Partnership Project. "Flexible RLC and MAC for HSPA Evolution." Tdoc R2-061389, TSG-RAN WG2 meeting #53, Shanghai, China, May 8-12, 2006.

3rd Generation Partnership Project. "L2 Enhancements." Tdoc R2-070036, 3GPP TSG-RAN WG2#56bis, Sorrento, Italy, Jan. 15-19, 2007.

3rd Generation Partnership Project. "Support of Higher Bitrates, Flexible RLC PDU Size on HS-DSCH and Enhanced Cell_FACH Transmission." R3-071218, 3GPP TSG-RAN WG3 Meeting #56, Kobe, Japan, May 7-11, 2007.

3rd Generation Partnership Project. 3GPP TS 25.425, V7.3.0 (Dec. 2006). 3rd Generation Partnership Project; Technical Specification Group Radio Access Network; UTRAN Iur interface user plane protocols for Common Transport Channel data streams (RElease 7), Dec. 2006.

Yan, X. et al. "Performance Evaluation of the UTRAN Transport Network for the High Speed Downlink Packet Access." Proceedings of the Australian Telecommunications Networks and Applications Conference 2006, Melbourne, Australia. Available at: http://www.ee.unimelb.edu.au/atnac2006/papers/69.pdf.

3rd Generation Partnership Project. "Support of Higher Bitrates and Flexible RLC PDU Size on HS-DSCH in RAN Transport Network." 3GPP TSG-RAN WG3 Meeting #55, R3-070416, St. Louis, USA, Feb. 12-16, 2007.

3rd Generation Partnership Project. "Improved L2 Support for High Data Rates Stage 2." 3GPP TSG-RAN2 Meeting #56bis, R2-070381, Sorrento, Italy, Jan. 15-19, 2007.

3rd Generation Partnership Project. "Grouping of Logical Channels to Priority Queues." 3GPP TSG-RAN WG2#56bis, Tdoc R2-07407, Sorrento, Italy, Jan. 15-19, 2007.

3GPP, "Technical Specification Group Radio Access Network; UTRAN Iub Interface User Plane Protocols for Common Transport Channel Data Streams (Release 7)", 3GPP TS 25.435 V7.3.0 , Dec. 1, 2006, pp. 1-43, Sophia Antipolis Cedex, France.

Ericsson et al., "Support of higher bitrates and Flexible FLC PDU size on HS-DSCH and introduction of FSN/DRT Reset", 3GPP TSG-RAN WG3 Meeting #56, May 7-11, 2007, Kobe, Japan, R3-071226.

* cited by examiner

FIG. 7B

| MAC-d PDU length in block n | MI ~726 |
| M len n (cont) | #PDUs in block n |

725

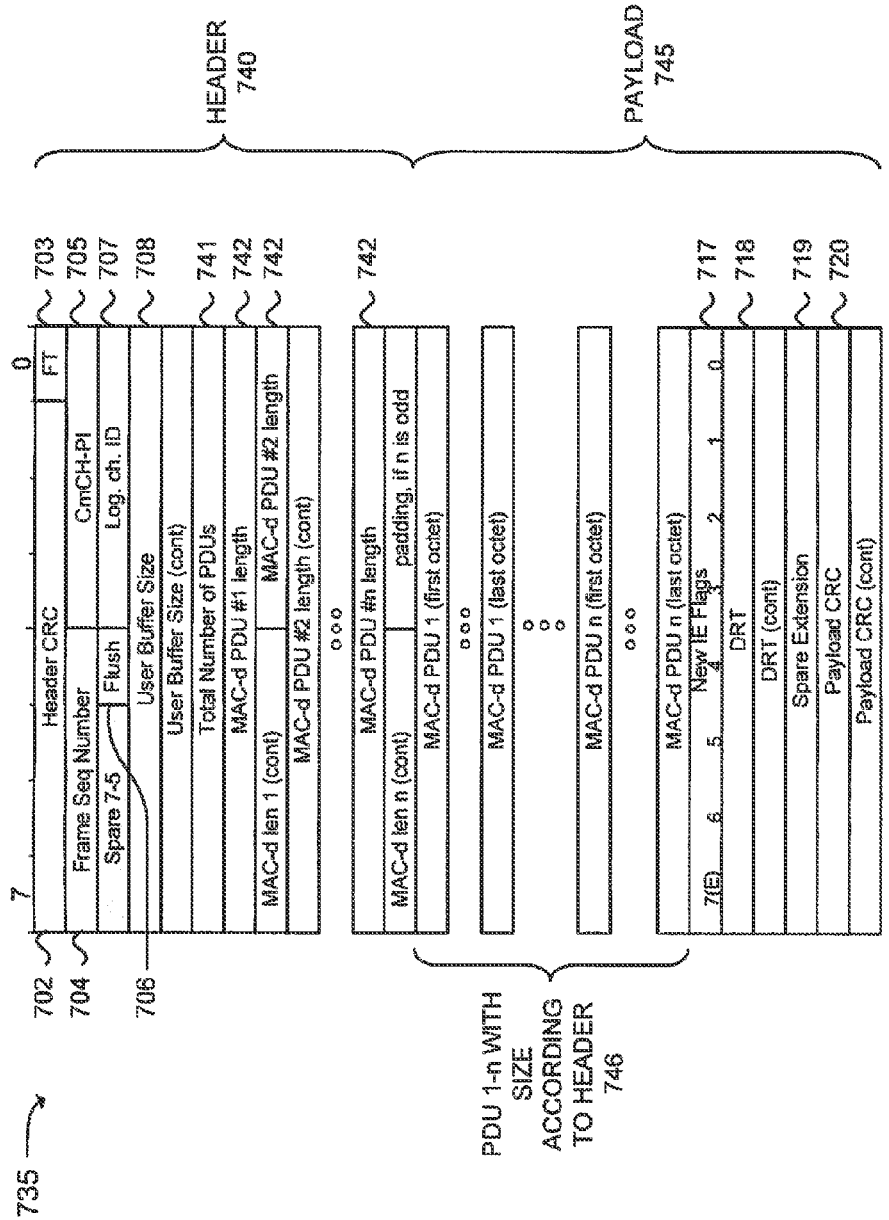

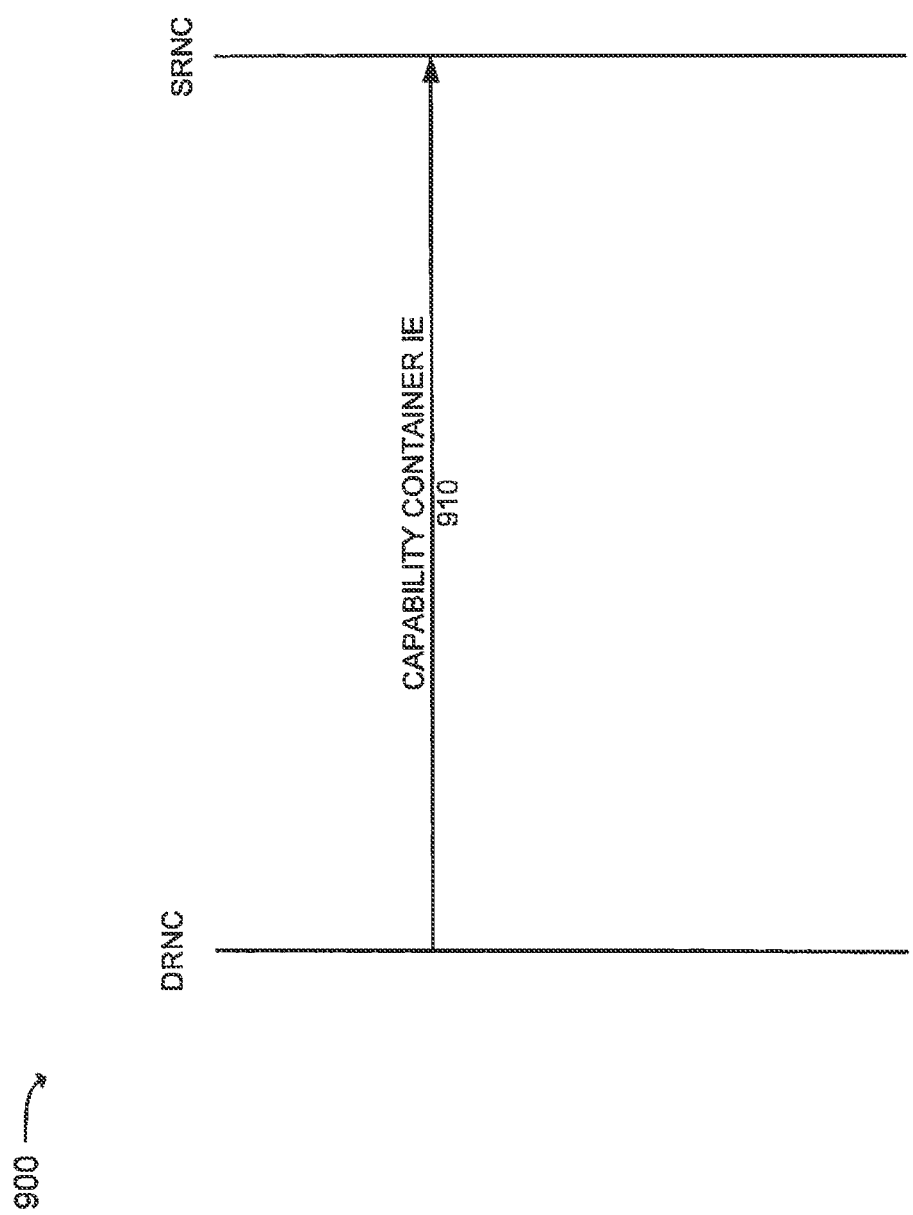

FLEXIBLE RADIO LINK CONTROL PACKET DATA UNIT LENGTH

RELATED APPLICATIONS

This application is a continuation of U.S. application Ser. No. 12/525,852 filed on 27 Oct. 2009, which was the National Stage of International Application No. PCT/SE2008/050016, filed 7 Jan. 2008, the disclosure of which is incorporated herein by reference in its entirety. This application also claims the benefit of Swedish Application No. SE 0700302-3, filed 6 Feb. 2007

TECHNICAL FIELD

Embodiments consistent with the present disclosure relate generally to wireless communication systems, and more particularly, to data flow control in a mobile communication system.

BACKGROUND

Wideband Code Division Multiple Access Radio Access Network (WRAN) introduced High Speed Downlink Packet Access (HSDPA) in 3GPP Release 5 and High Speed Uplink Packet Access (HSUPA)/Enhanced Uplink (EUL) in 3GPP Release 6. High Speed Packet Access (HSPA) is the common term for both HSDPA and EUL. 3GPP specifications from Release 4 to Release 6 use a few fixed Medium Access Control-d (MAC-d) Packet Data Unit (PDU) lengths for HSPA. The Radio Link Control (RLC) transmission window limitation of 2,047 PDUs together with the rather long Round-Trip-Time (from the serving radio network controller to user equipment and back) gives a limited peak bitrate in cellular systems.

The introduction of Multiple Input, Multiple Output (MIMO) and/or 64 Quadrature Amplitude Modulation (QAM) may result in peak bitrates as high as 42 Megabits per second (Mbps). Longer MAC-d PDU lengths are needed for a higher HSDPA peak bitrate (assuming that the RLC window size of 2,047 is maintained). Using MAC-d PDUs that are too long causes limited coverage, as long as only an integer number of MAC-d PDUs is scheduled over the air-interface in one Transmission Time Interval (TTI), i.e., one MAC-d PDU is the smallest unit of data that can be transmitted in one TTI.

RLC Acknowledged Mode (AM) provides a structure for using flexible PDU lengths. In, for example, RLC AM (3GPP TS 25.322, RLC protocol specification), a flexible PDU length structure is defined. There is a possibility to configure several RLC PDU lengths, but header fields may restrict the de-facto number that can be used. For example, it is currently possible to use maximally 8 different MAC-d PDU lengths over HS-DSCH, where a MAC-d PDU includes an RLC PDU and optional MAC-d header. A completely new PDU length structure is, therefore, needed for optimal performance.

The current solution for High Speed Downlink Shared Channel (HS-DSCH) capacity allocation and the definition of the HS-DSCH DATA FRAME are not efficient for the flexible RLC (or flexible PDU length structure) solution. The HS-DSCH Data Frame bitrate cannot be controlled well using the current HS-DSCH Capacity Allocation Control Frame format. The current control frame format specifies that a given number of PDUs (HS-DSCH Credits) of given maximum length (Maximum MAC-d PDU Length) can be sent in a given interval (HS-DSCH Interval). Assuming a fixed MAC-d PDU length, it is easy to translate this format to octets within an interval, or to a bitrate. However, with the introduction of flexible RLC, each and every MAC-d PDU can be of different length. Thus, a PDU of one octet consumes a full credit, just like a PDU of 1,500 octets, and controlling the allowed number of octets per interval, or the allowed bitrate, becomes difficult.

The initial capacity of HS-DSCH data transfer is granted by the base station via the HS-DSCH Initial Capacity Allocation during the Radio Link Setup procedure, the Radio Link Reconfiguration procedure, or the Radio Link Addition procedure. During these procedures, the HS-DSCH Initial Capacity Allocation, which is sent by the base station to the controlling radio network controller, specifies the maximum MAC-d PDU length (Maximum MAC-d PDU Size) and the number of MAC-d PDUs (HS-DSCH Initial Window Size). The current interpretation of this HS-DSCH Initial Capacity Allocation is used for fixed MAC-d PDU lengths and is obviously not suitable for flexible RLC.

The current HS-DSCH DATA FRAME format does not support different MAC-d PDU lengths. Sending MAC-d PDUs of different length might become very inefficient (e.g., the transport network overhead can become very high), because a new DATA FRAME is needed for every PDU of different length. Moreover, in the current format, a 4-bit spare extension is inserted in front of every MAC-d PDU in the data frame, increasing the overhead significantly in the case of octet aligned PDUs, which is a common case. The current format cannot handle the flexible RLC approach (e.g., where a MAC-d PDU containing a 1,500 octets long Internet Protocol (IP) packet is to be sent). At the same time, the current MAC-d PDU length indicator assumes bit granularity, which is not needed if MAC-d PDUs become octet aligned with the removal of MAC-d multiplexing. Moreover, with the removal of MAC-d multiplexing, if the HS-DSCH DATA FRAME does not support some type of logical channel mapping, the number of transport network connections needed by some Radio Bearers might increase significantly (e.g., instead of one connection, four connections may be needed for a Signaling Radio Bearer (SRB)).

SUMMARY

It is an object of the present disclosure to overcome at least some of the above disadvantages and to provide an improved data flow control for communication systems.

Embodiments described herein provide a new HS-DSCH framing protocol format (referred to hereinafter as a "HS-DSCH framing protocol type 2 format") that may allow for transmission of PDUs of differing lengths. In one embodiment, the HS-DSCH framing protocol type 2 format provides a new HS-DSCH framing protocol type 2 CAPACITY ALLOCATION Control Frame format that specifies MAC-d PDU credits in octets (as opposed to a combination of a number of PDUs of a given maximum length). The HS-DSCH framing protocol type 2 CAPACITY ALLOCATION Control Frame also supports larger MAC-d PDU lengths by allowing the reuse of unused credits.

In addition to a new CAPACITY ALLOCATION Control Frame format, the HS-DSCH framing protocol type 2 frame format provides a new HS-DSCH framing protocol type 2 DATA FRAME format. The HS-DSCH framing protocol type 2 DATA FRAME may allow more than one PDU length in the same DATA FRAME. Moreover, the HS-DSCH framing protocol type 2 DATA FRAME format may, in one embodiment, allow for the transmission of several PDUs associated with different logical channels in the same DATA FRAME.

The new HS-DSCH framing protocol type 2 frame format may provide:
- a maximum MAC-d PDU length of ~1500 octets and octet granularity in MAC-d PDU length is efficiently supported;
- ability to take into account the Maximum Transmission Unit limitation of the used transport network;
- ability to support flexible MAC-d PDU lengths;
- ability to support higher High Speed Packet Access (HSPA) Evolution bitrates (e.g., up to ~42 Megabits per second (Mbps));
- small Transport Network Layer overhead (data frame header and control frame length); and single data frame and control frame format, making for easier expansion in the future.

According to one aspect of the present disclosure, an example method is performed by a first device in a HSDPA environment. The first device generates a HS-DSCH data frame that includes a plurality of blocks of packet data units. A first block of the plurality of blocks includes packet data units of a first length, and a second block of the plurality of blocks includes packet data units of a different, second length. The first device transfers the HS-DSCH data frame to a second device. The HS-DSCH data frame further includes, for each block of the plurality of blocks, a first information element that indicates a length of the one or more packet data units in the each block, and a second information element that indicates a quantity of packet data units in the each block Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 7A-7E are exemplary diagrams of portions of HS-DSCH framing protocol type 2 DATA FRAMES according to exemplary embodiments.

FIG. 9 is an exemplary flow diagram according to an exemplary embodiment.

DETAILED DESCRIPTION

The following detailed description refers to the accompanying drawings. The same reference numbers in different drawings may identify the same or similar elements. Also, the following detailed description does not limit the present disclosure.

Embodiments described herein provide a HS-DSCH framing protocol (referred to as "HS-DSCH framing protocol type 2") that allows for transmission of PDUs of differing lengths.

Figure 1:
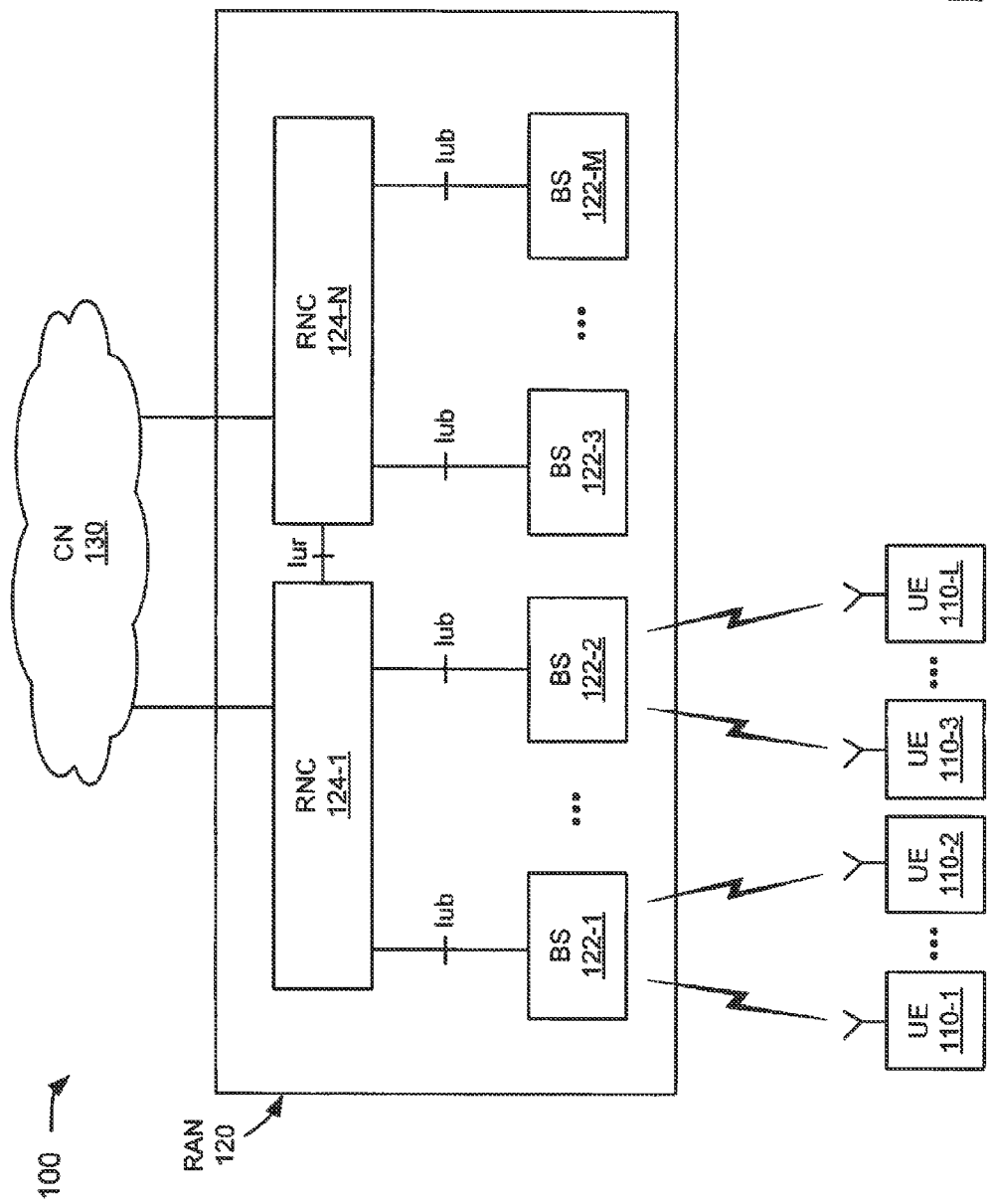
FIG. 1 is a diagram of an exemplary network in which systems and methods described herein may be implemented.

FIG. 1 is a diagram of an exemplary network 100 in which systems and methods described herein may be implemented. Network 100 may include a group of user equipment (UE) 110-1 through 110-L (referred to collectively, and in some instances individually, as "user equipment 110"), a radio access network (RAN) 120, and a core network (CN) 130. Four user equipment 110, one radio access network 120, and one core network 130 have been illustrated for simplicity. In practice, there may be more or fewer user equipment, radio access networks, and/or core networks.

User equipment 110 may include one or more devices capable of sending/receiving voice and/or data to/from radio access network 120. In one embodiment, user equipment 110 may include, for example, a wireless telephone, a personal digital assistant (PDA), a laptop, etc.

Radio access network 120 may include one or more devices for transmitting voice and/or data to user equipment 110 and core network 130. As illustrated, radio access network 120 may include a group of base stations (BSs) 122-1 through 122-M (referred to collectively as "base stations 122" and in some instances, individually as "base station 122") and a group of radio network controllers (RNCs) 124-1 through 124-N (referred to collectively as "radio network controllers 124" and in some instances, individually as "radio access controller 124"). Four base stations 122 and two radio network controllers 124 are shown in FIG. 1 for simplicity. In practice, there may be more or fewer base stations and/or radio network controllers.

Base stations 122 (also referred to as "Node Bs") may include one or more devices that receive voice and/or data from radio network controllers 124 and transmit that voice and/or data to user equipment 110 via an air interface. Base stations 122 may also include one or more devices that receive voice and/or data from user equipment 110 over an air interface and transmit that voice and/or data to radio network controllers 124 or other user equipment 110.

Radio network controllers 124 may include one or more devices that control and manage base stations 122. Radio network controllers 124 may also include devices that perform user data processing to manage utilization of radio network services. Radio network controllers 124 may transmit/receive voice and data to/from base stations 122, other radio network controllers 124, and/or core network 130.

A radio network controller 124 may act as a controlling radio network controller (CRNC), a drift radio network controller (DRNC), or a serving radio network controller (SRNC). A CRNC is responsible for controlling the resources of a base station 122. On the other hand, an SRNC serves a particular user equipment 110 and manages the connections towards that user equipment 110. Likewise, a DRNC fulfills a similar role to the SRNC (e.g., may route traffic between a SRNC and a particular user equipment 110).

As illustrated in FIG. 1, a radio network controller 124 may connect to a base station 122 via an Iub interface and to another radio network controller 124 via an Iur interface.

Core network 130 may include one or more devices that transfer/receive voice and/or data to a circuit-switched and/or packet-switched network. In one embodiment, core network 130 may include, for example, a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

In some embodiments, one or more components of network 100 may perform one or more of the tasks described as being performed by one or more other components of network 100.

Figure 2:
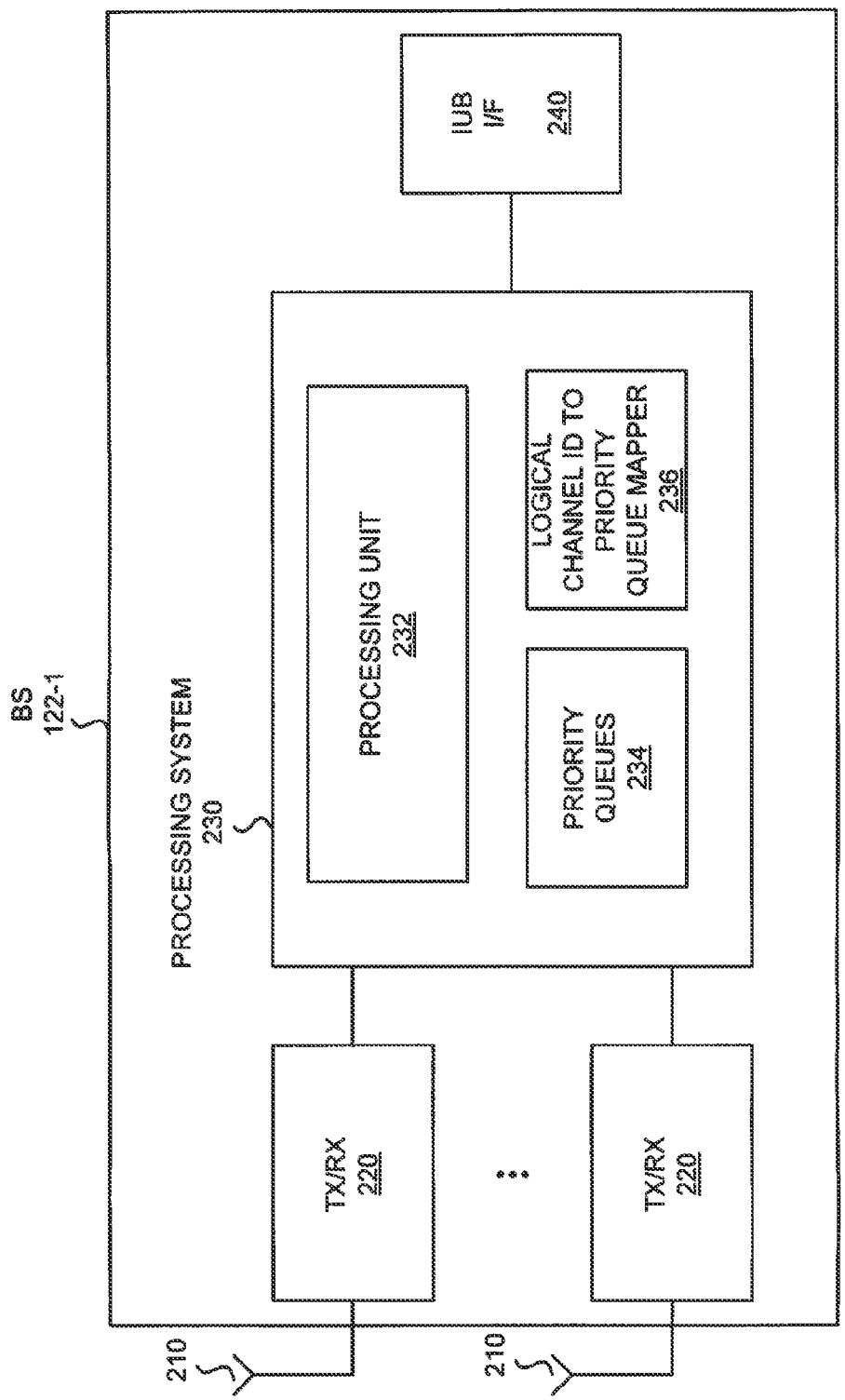
FIG. 2 is an exemplary diagram of a base station of FIG. 1.

FIG. 2 is an exemplary diagram of base station 122-1 according to an exemplary embodiment. Base stations 122-2 through 122-M may be similarly configured. As shown in FIG. 2, base station 122-1 may include antennas 210, transceivers (TX/RX) 220, processing system 230, and Iub interface (I/F) 240. Base station 122-1 may include additional and/or different components than illustrated in FIG. 2.

Antennas 210 may include one or more directional and/or omnidirectional antennas. Transceivers 220 may be associated with antennas 210 and include transceiver circuitry for transmitting and/or receiving symbol sequences in a network, such as network 110, via antennas 210.

Processing system 230 may control the operation of base station 122-1. Processing system 230 may also process information received via transceivers 220 and Iub interface 240. Processing system 230 may further measure quality and strength of connection and determine the frame error rate (FER), and transmit this information to radio network controller 124-1. As illustrated, processing system 230 may include a processing unit 232, a group of priority queues 234, and a logical channel identifier (ID) to priority queue mapper 236. It will be appreciated that processing system 230 may include additional and/or different components than illustrated in FIG. 2.

Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, and quadrature phase shift keying (QPSK) modulation, etc. In addition, processing unit 232 may generate control messages and/or data messages (e.g., HS-DSCH DATA FRAMES) and cause those control messages and/or data messages to be transmitted via transceivers 220 and/or Iub interface 240. Processing unit 232 may also process control messages and/or data messages received from transceivers 220 and/or Iub interface 240.

Priority queues 234 may store information (e.g., in the form of PDUs) to be transmitted to and/or that has been received from user equipment 110. In one embodiment, each user equipment 110 associated with base station 122-1 may be associated with one or more priority queues from priority queues 234. A priority queue may, for example, be initialized for a user equipment 110 when a MAC-d flow is established for that user equipment 110.

Logical channel identifier to priority queue mapper 236 may map received logical channel identifiers to priority queue identifiers. In one embodiment, a HS-DSCH framing protocol type 2 DATA FRAME may associate one or more logical channel identifiers with one or more PDUs stored in the DATA FRAME. Base station 122-1 may use the logical channel identifiers to identify the appropriate priority queues from priority queues 234 for storing the PDUs.

Iub interface 240 may include one or more line cards that allow base station 122-1 to transmit data to and receive data from radio network controller 124-1.

In some embodiments, one or more components of base station 122-1 may perform the tasks described as being performed by one or more other components of base station 122-1.

Figure 3:
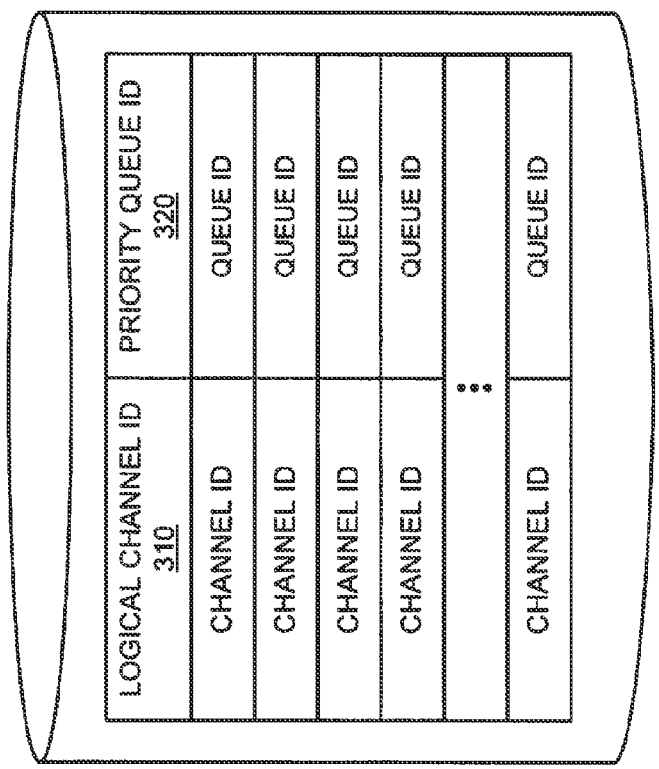
FIG. 3 is an exemplary diagram of a computer-readable medium that may be associated with the base station of FIG. 1.

FIG. 3 is an exemplary diagram of a computer-readable medium 300 that may be associated with a base station, such as base station 122-1. While one computer-readable medium is described below, it will be appreciated that computer-readable medium 300 may include multiple computer-readable media stored locally at base station 122-1, or stored at one or more different and possibly remote locations.

As illustrated, computer-readable medium 300 may maintain a group of entries in the following exemplary fields: a logical channel identifier field 310 and a priority queue identifier field 320. Computer-readable medium 300 may maintain additional or different information than that illustrated in FIG. 3.

Logical channel identifier field 310 may store a sequence of characters that identifies a logical channel with which user equipment, such as user equipment 110-1, is associated. In one embodiment, the sequence of characters may be unique for that particular base station. Priority queue identifier field 320 may store a sequence of characters that identifies a priority queue in priority queues 234. In one embodiment, each priority queue in priority queues 234 may be associated with a unique sequence of characters that acts as an identifier for that priority queue.

Thus, via computer-readable medium 300, base station 122-1 may identify a priority queue based on a received logical channel identifier.

Figure 4:
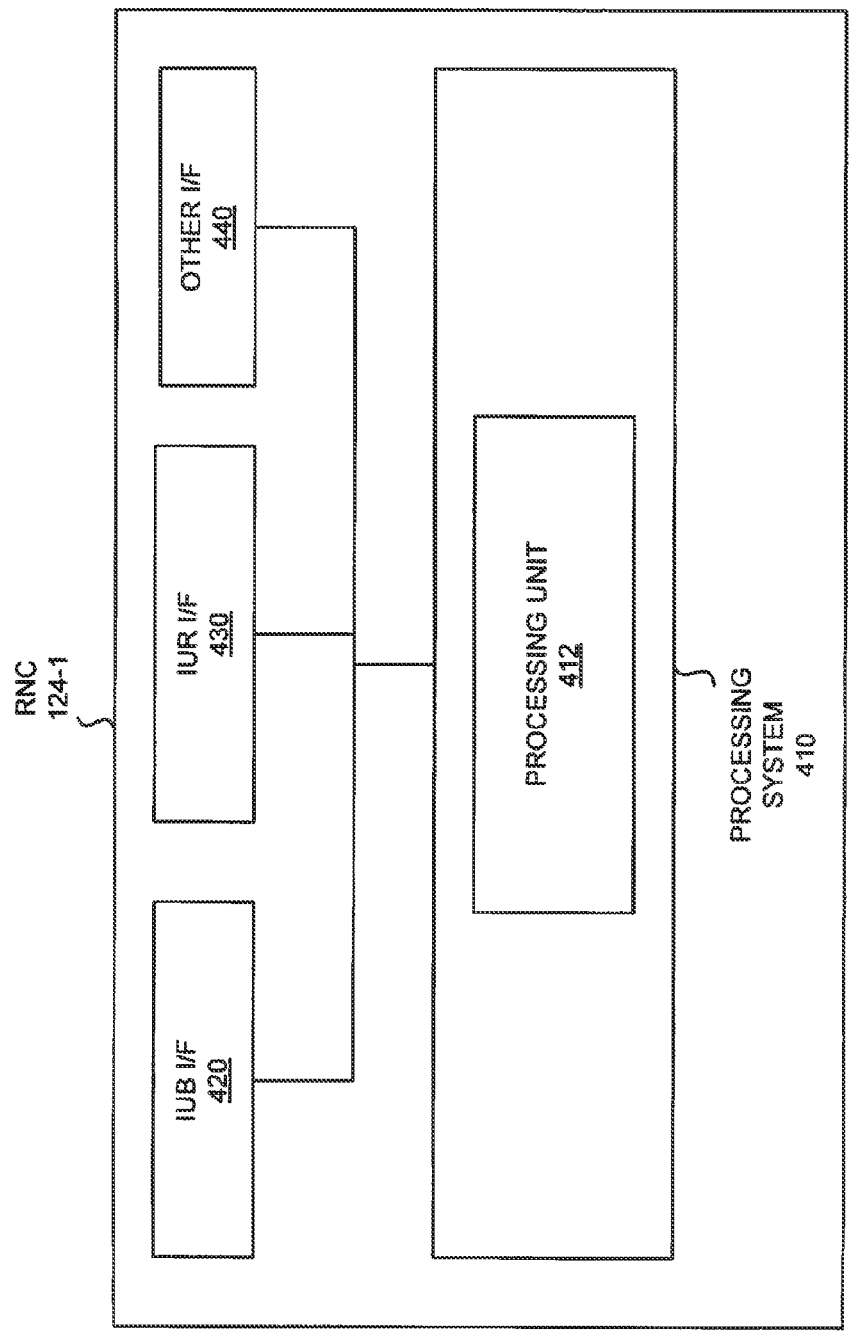
FIG. 4 is an exemplary diagram of a radio network controller of FIG. 1.

FIG. 4 is an exemplary diagram of radio network controller 124-1 according to an exemplary embodiment. Radio network controller 124-2 may be similarly configured. As shown in FIG. 4, radio network controller 124-1 may include a processing system 410, an Iub interface 420, an Iur interface 430, and/or other interfaces 440. Radio network controller 124-1 may include additional and/or different components than the components illustrated in FIG. 4.

Processing system 410 may control the operation of radio network controller 124-1. As illustrated, processing system 410 may include a processing unit 412 that handles protocol exchanges between Iub interface 420, Iur interface 430, and other interfaces 440. In addition, processing unit 412 may generate control messages and/or data messages and transmit those control messages and/or data messages via interfaces 420-440. Processing unit 412 may also process control messages and/or data messages received from interfaces 420-440.

Iub interface 420 may include one or more line cards that allow radio network controller 124-1 to transmit control messages and/or data messages to and receive control messages and/or data messages from base station 122-1. Iur interface 430 may include one or more line cards that allow radio network controller 124-1 to transmit control messages and/or data messages to and receive control messages and/or data messages from another radio network controller, such as radio network controller 124-2. Other interfaces 440 may include interfaces to other devices and/or networks. For example, other interfaces 440 may include an Iucs interface, which is a core network interface to a circuit-switched voice network, and an Iups interface, which is a core network interface to a packet-switched data network.

In some embodiments, one or more components of radio network controller 124-1 may perform the tasks described as being performed by one or more other components of radio network controller 124-1.

Figure 5:
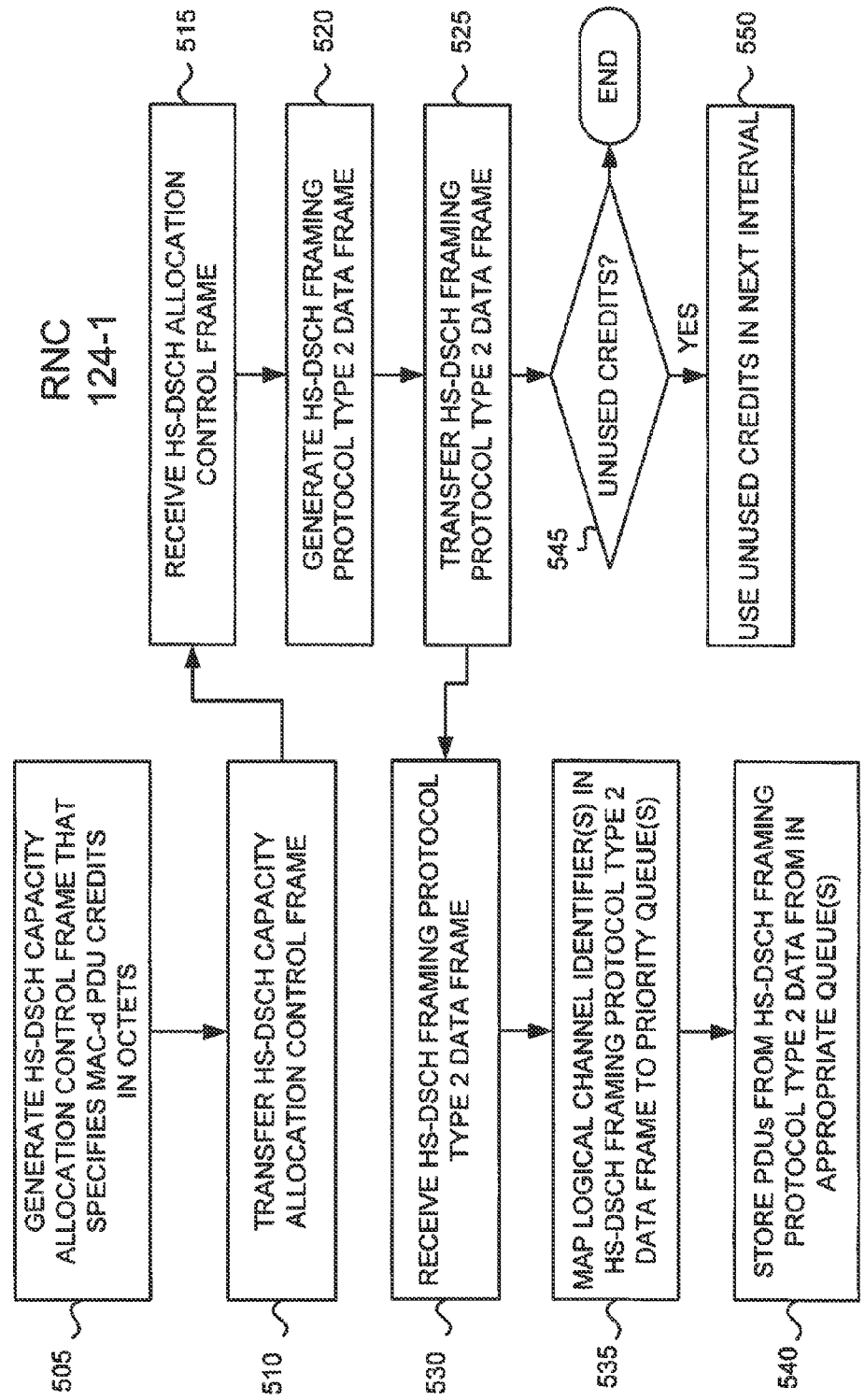
FIG. 5 is a flowchart of an exemplary process for transmitting a data frame according to an exemplary embodiment.

FIG. 5 is a flowchart of an exemplary process for transmitting a data frame according to an exemplary embodiment. In one embodiment, portions of the process described in FIG. 5 may be performed by a base station, such as base station 122-1, and a portion of the process may be performed by a radio network controller, such as radio network controller 124-1. In another embodiment, some or all of the exemplary process described below may be performed by another device or combination of devices.

The exemplary process may begin with base station 122-1 generating a HS-DSCH framing protocol type 2 CAPACITY ALLOCATION Control Frame (block 505). In one embodiment, base station 122-1 may generate the HS-DSCH framing protocol type 2 CAPACITY ALLOCATION Control Frame in response to a HS-DSCH Capacity Request from radio network controller 124-1 or at any other time. Among other things, the HS-DSCH framing protocol type 2 CAPACITY ALLOCATION Control Frame may specify MAC-d PDU credits in octets, rather than by a number of PDUs.

Figure 6:
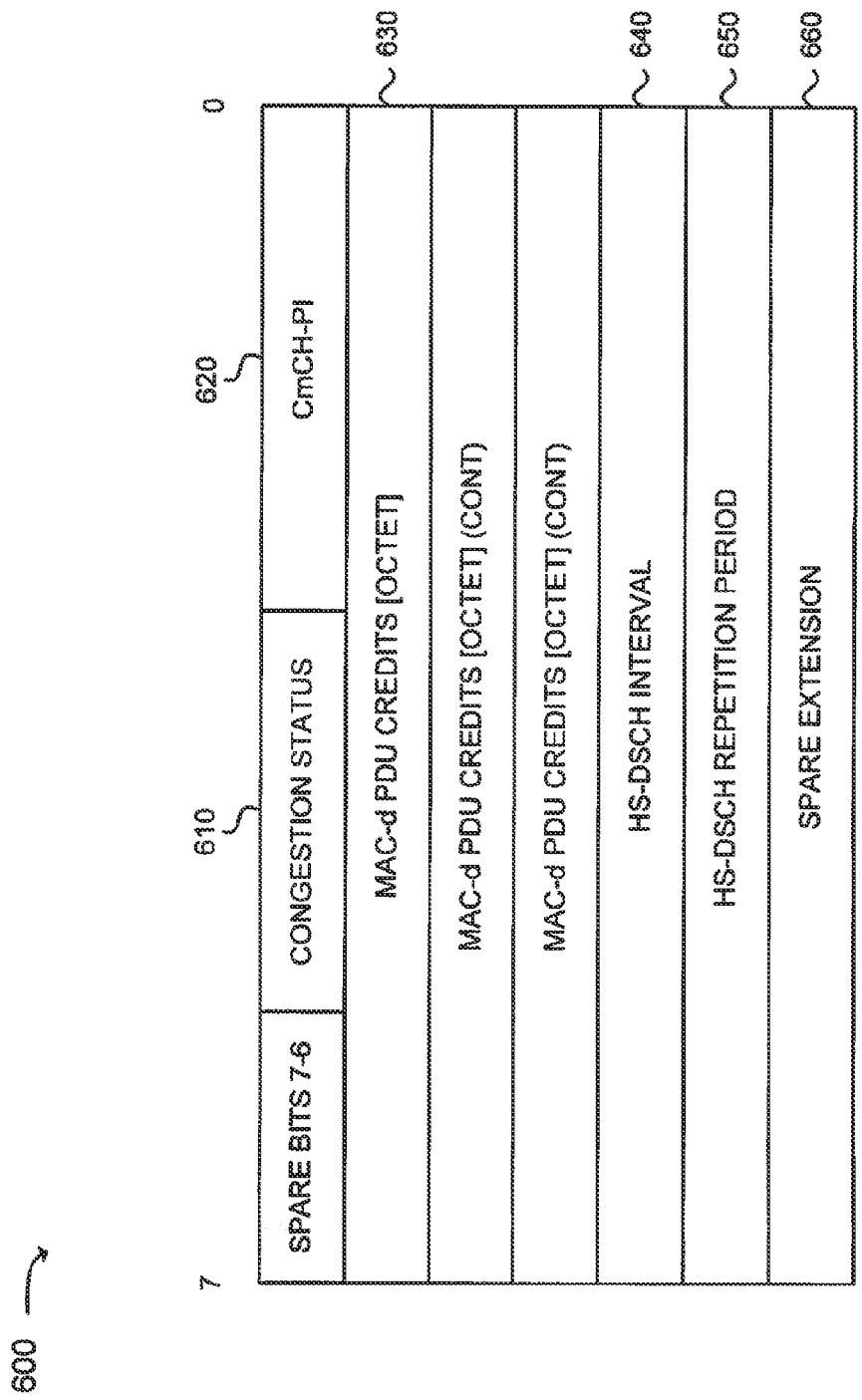
FIG. 6 is an exemplary diagram of a High Speed Downlink Shared Channel (HS-DSCH) framing protocol type 2 CAPACITY ALLOCATION Control Frame according to an exemplary embodiment.

FIG. 6 is an exemplary diagram of a HS-DSCH framing protocol type 2 CAPACITY ALLOCATION Control Frame 600 according to an exemplary embodiment. As illustrated, HS-DSCH framing protocol type 2 CAPACITY ALLOCATION Control Frame 600 may include a Congestion Status information element 610, a Common Transport Channel Priority Indicator (CmCH-PI) information element 620, MAC-d PDU Credits information element 630, a HS-DSCH Interval information element 640, a HS-DSCH Repetition Period information element 650, and a Spare Extension information element 660. In other embodiments, HS-DSCH framing protocol type 2 CAPACITY ALLOCATION Control Frame 600 may maintain additional or different information elements than the information elements illustrated in FIG. 6.

Congestion Status information element 610 may include information that indicates whether a congestion situation has been detected. Common Transport Channel Priority Indicator information element 620 may include information that indicates the relative priority of the data frame to be transferred from radio network controller 124-1. MAC-d PDU Credits information element 630 may include information indicating the number of MAC-d PDUs octets that a radio network controller may transmit during one HS-DSCH interval granted by HS-DSCH framing protocol type 2 CAPACITY ALLOCATION Control Frame 600. In one embodiment, the value for MAC-d PDU Credits information element may range, e.g., from 0 to 16,777,215, where "0" may represent stop transmission, and "16,777,215" may represent an unlimited transmission. The field length of MAC-d PDU Credits information element may be 24 bits.

In an alternative embodiment, MAC-d PDU Credits information element 630 may be 20 bits, where three of the remaining four bits may be used as spare bits and one bit may be used to indicate whether or not unused credit octets may be reused by radio network controller 124-1 in the next interval.

HS-DSCH Interval information element 640 may store information representing a time interval during which the HS-DSCH Credits granted in HS-DSCH framing protocol type 2 CAPACITY ALLOCATION Control Frame 600 may be used. HS-DSCH Repetition Period information element 650 may store information that represents the number of subsequent intervals that the HS-DSCH Credits in HS-DSCH framing protocol type 2 CAPACITY ALLOCATION Control Frame 600 may be used. Spare Extension information element 660 may be a placeholder for future information elements that may be added to HS-DSCH framing protocol type 2 CAPACITY ALLOCATION Control Frame 600.

Thus, according to one exemplary embodiment, a new "MAC-d PDU Credits" information element 630 is introduced into a HS-DSCH CAPACITY ALLOCATION Control Frame, which replaces the old "HS-DSCH Credits" field. With MAC-d PDU Credits information element 630 having octet granularity (not number of PDUs), situations may arise where at the end of a HS-DSCH interval, one or more octets cannot be used for sending MAC-d PDUs (e.g., because the amount of remaining octets is less than the length of the waiting MAC-d PDU). If HS-DSCH Repetition Period information element 650 indicates that the repetition period is larger than 1 or is zero, the "MAC-d PDU Credits" may be granted to the transport network flow in every HS-DSCH interval. In this situation, the radio network controller may reuse these unused credits at the beginning of the next HS-DSCH interval.

Returning to FIG. 5, base station 122-1 may transfer the HS-DSCH framing protocol type 2 CAPACITY ALLOCATION Control Frame (e.g., HS-DSCH framing protocol type 2 CAPACITY ALLOCATION Control Frame 600) to radio network controller 124-1 (block 510). For example, base station 122-1 may transfer the HS-DSCH framing protocol type 2 CAPACITY ALLOCATION Control Frame to radio network controller 124-1 via Iub interface 240.

Radio network controller 124-1 may receive the HS-DSCH framing protocol type 2 CAPACITY ALLOCATION Control Frame (block 515). For example, radio network controller 124-1 may receive the HS-DSCH framing protocol type 2 CAPACITY ALLOCATION Control Frame via Iub interface 420. In response to receiving the HS-DSCH framing protocol type 2 CAPACITY ALLOCATION Control Frame, radio network controller 124-1 may generate a HS-DSCH framing protocol type 2 DATA FRAME (block 520). Among other things, the HS-DSCH framing protocol type 2 DATA FRAME may store blocks of PDUs of the same length, where the PDUs of one block may differ in length from PDUs of another block.

Figure 7A:
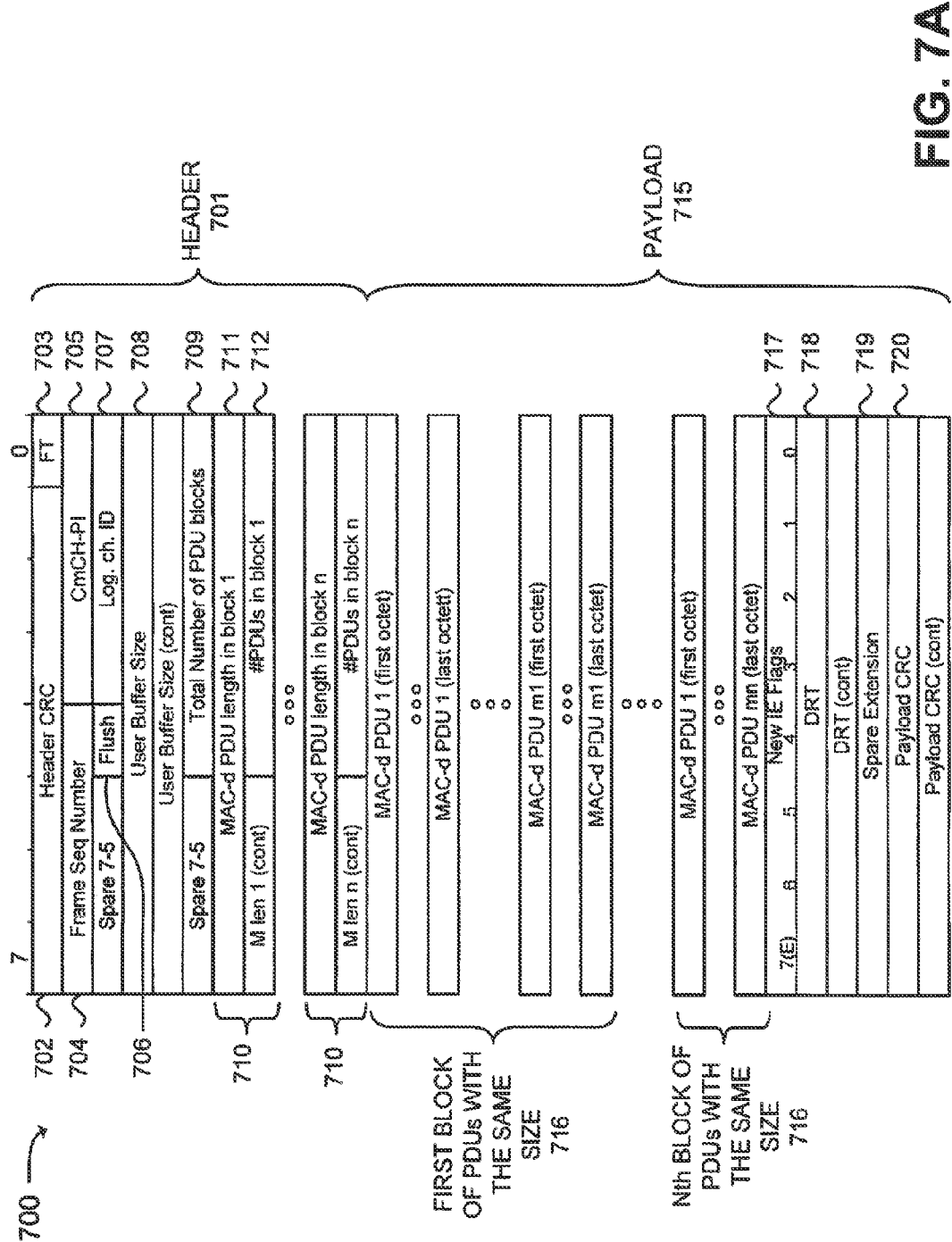

FIG. 7A is an exemplary diagram of a HS-DSCH framing protocol type 2 DATA FRAME 700 according to an exemplary embodiment. As illustrated, HS-DSCH framing protocol type 2 DATA FRAME 700 may include a header 701 and a payload 715. Header 701 may include a Header Cyclic Redundancy Checksum (CRC) information element 702, a Frame Type (FT) information element 703, a Frame Sequence (Seq.) Number information element 704, a Common Transport Channel Priority Indicator (CmCH-PI) information element 705, a Flush information element 706, a Logical (Log.) Channel (ch.) Identifier (ID) information element 707, a User Buffer Size information element 708, a Total Number of PDU Blocks information element 709, and a number (#) of PDU block description information elements 710 (e.g., where each block is associated with a MAC-d PDU Length in Block information element 711 and a number of PDUs (#PDUs) in Block information element 712). In other embodiments, header 701 may include additional and/or different information elements than depicted in FIG. 7A.

Header CRC information element 702 may store a CRC calculated on header 701 of DATA FRAME 700. Frame Type information element 703 may store information indicating whether frame 700 is a data frame or a control frame. Frame Sequence Number information element 704 may store a value representing the frame sequence number for DATA FRAME 700 in a MAC-d flow. Common Transport Channel Priority Indicator information element 705 may include information that indicates the relative priority of DATA FRAME 700. Flush information element 706 may store information that indicates whether the DRNC should or should not remove all the MAC-d PDUs form the corresponding priority queue that have been received prior to DATA FRAME 700 on the same transport bearer. Logical Channel Identifier information element 707 may store information identifying a logical channel instance when multiple logical channels are carried on the same transport network flow. In one embodiment, Logical Channel Identifier information element 707 may store, for example, a value between 0 and 15, where the values 0 to 14 may identify Logical channels 1-15, and the value 15 may be reserved for future use. The field length of Logical Channel Identifier information element 707 may be four bits in one exemplary embodiment. User Buffer Size information element 708 may store information representing the buffer size (e.g., the amount of data in the buffer) in octets for a given Common Transport Channel Priority Indicator level.

Total Number of PDU Blocks information element 709 may store information representing the total number of PDU blocks in DATA FRAME 700. A PDU block may be defined as one or more PDUs of the same length. Each PDU block may be described by the length of PDUs and the number of PDUs in the block. In situations where in-order delivery is desirable, more than one block with PDUs of the same length may be included in DATA FRAME 700. For example, if the maximum PDU length is significantly smaller than a full IP packet, the IP packet may be segmented in many PDUs in sequence, each with the same maximum PDU length. In one embodiment, a PDU block may support PDU lengths that are as long as an IP packet (e.g., 1,500 octets). Total Number of PDU Blocks information element 709 may store, for example, a value between 0 and 31, where the value "0" may represent an invalid value. The field length of Total Number of PDU Blocks information element 709 may be five bits in one exemplary embodiment.

As indicated above, each PDU block in DATA FRAME 700 may be associated with PDU block description information elements 710. PDU block description information elements 710 may include a MAC-d PDU Length in Block information element 711 and a Number (#) of PDUs in Block information element 712. MAC-d PDU Length in Block information element 711 may store information representing the length of every MAC-d PDU in that particular block. The length may be provided in octets. In one embodiment, MAC-d PDU Length in Block information element 711 may store, for example, a value between 0 and 2,047, where the value "0" may represent an invalid value. The field length of MAC-d PDU Length in Block information element 711 may be eleven bits in one exemplary embodiment. Number of PDUs in Block information element 712 may store information representing a quantity of MAC-d PDUs in the particular block. In one embodiment, Number of PDUs in Block information element 712 may store, for example, a value between 0 and 31, where the value "0" may represent an invalid value. The field length of Number of PDUs in Block information element 712 may be five bits in one exemplary embodiment.

Payload 715 may include one or more blocks of PDUs 716, a New Information Element (IE) Flags information element 717, a Delay Reference Time (DRT) information element 718, a Spare Extension information element 719, and a Payload CRC information element 720. In other embodiments, payload 715 may include additional and/or different information elements than depicted in FIG. 7A.

The order of PDU blocks 716 in payload 715 may follow a corresponding order of the PDU block description information elements in header 701. In the exemplary configuration illustrated in FIG. 7A, header 701 includes descriptions for PDU blocks 1 to n. Thus, payload 715 may include n PDU blocks, ordered from 1 to n. As indicated above, each PDU block may include one or more PDUs of the same length. However, the length of PDUs in one block may differ from the length of PDUs in another block in payload 715.

New Information Element Flags information element 717 may store information (e.g., one or more flags) if at least one new information element is present in DATA FRAME 700. Each flag may indicate which new information elements are present following New Information Element Flags information element 717. Delay Reference Time information element 718 may store information used for dynamic delay measurements. Spare Extension information element 719 may be a placeholder for future information elements that may be added to DATA FRAME 700. Payload CRC information element 720 may store a CRC calculated on payload 715 of DATA FRAME 700.

As an alternative to the exemplary configuration illustrated in FIG. 7A, the MAC-d PDU Length in Block information element may be increased by one bit to be able to support 4-bit MAC-d PDU length granularity. This alternative embodiment may support legacy user equipment with MAC-d multiplexing enabled. If the removal of MAC-d multiplexing is not accepted in a radio access network, the length of the MAC-d PDU Length in Block information element may be increased to express the length in 4-bit units and the Logical Channel Identifier information element may be removed.

In some situations (e.g., when a DATA FRAME includes small PDUs of different length), a 1-bit "More Information" information element may be included in PDU block description information elements 710 in header 701. An exemplary diagram of alternative PDU description information elements 725 for this alternative embodiment is depicted in FIG. 7B. As illustrated, the MAC-d PDU Length in Block information element and the Number (#) of PDUs in Block information element from DATA FRAME 700 are supplemented with a "More Information" (MI) information element 726, which may store information relating to the PDUs in the block. In one embodiment, if the "More Information" information element 726 stores a value of 0, the associated MAC-d PDU Length in Block information element may be seven bits long and the number of PDUs in the given block may be 1. If, on the other hand, the "More Information" information element 726 stores a value of 1, four bits of the next octet may also indicate length (13 bits in total) and the other four bits may indicate the number of PDUs.

Figure 7C:
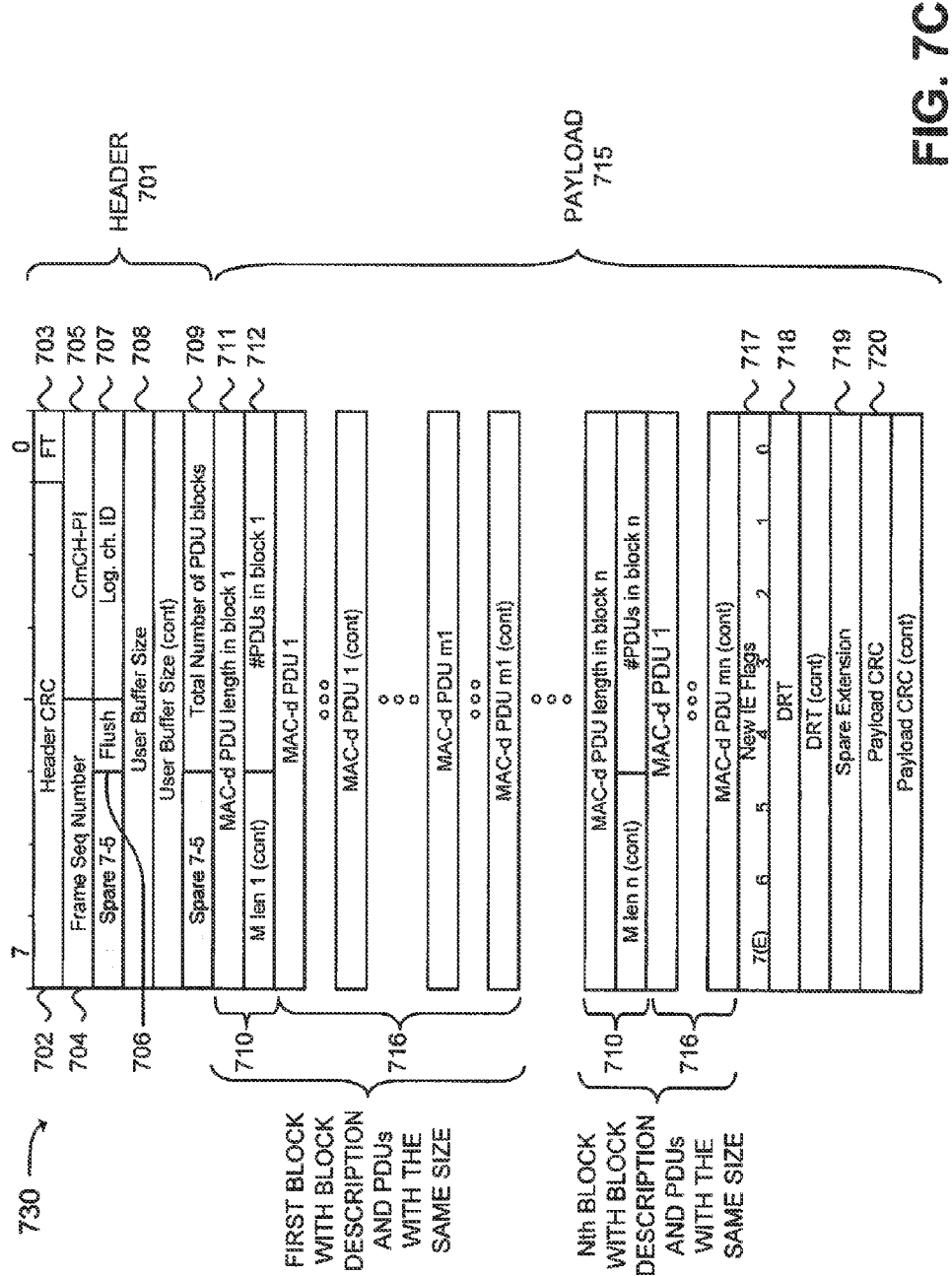

FIG. 7C is an exemplary alternative diagram of a HS-DSCH framing protocol type 2 DATA FRAME 730 according to an exemplary embodiment. In this embodiment, PDU description information elements 710 (i.e., MAC-d PDU Length in Block information element 711 and Number of PDUs in Block information element 712) for each block are distributed in payload 715, instead of header 701 (as in DATA FRAME 700). As illustrated, PDU description information element 710 for a given block may be placed right before PDUs 716 for that block.

In another embodiment, a length indicator (e.g., a 12-bit indicator) for each MAC-d PDU may be included in the header or payload of a HS-DSCH framing protocol type 2 DATA FRAME. An exemplary HS-DSCH framing protocol type 2 DATA FRAME 735 with length indictors in a header portion 740 is illustrated in FIG. 7D. As shown, header 740 of HS-DSCH framing protocol type 2 DATA FRAME 735 may include a Header Cyclic Redundancy Checksum (CRC) information element 702, a Frame Type (FT) information element 703, a Frame Sequence (Seq.) Number information element 704, a Common Transport Channel Priority Indicator (CmCH-PI) information element 705, a Flush information element 706, a Logical (Log.) Channel (ch.) Identifier (ID) information element 707, a User Buffer Size information element 708, a Total Number of PDUs information element 741, and a number of MAC-d PDU Length Indicator information elements 742 (e.g., one for each PDU in DATA FRAME 735). In other embodiments, header 740 may include additional and/or different information elements than the information elements depicted in FIG. 7D.

Header Cyclic Redundancy Checksum information element 702, Frame Type information element 703, Frame Sequence Number information element 704, Common Transport Channel Priority Indicator information element 705, Flush information element 706, Logical Channel Identifier information element 707, and User Buffer Size information element 708 may include information similar to that described above with respect to FIG. 7A. Total Number of PDUs information element 741 may store information representing a number (or quantity) of PDUs in DATA FRAME 735. Each MAC-d PDU Length Indicator information element 742 may store information representing the length (e.g., in octets) of the corresponding PDU in payload 745. For example, if the PDU #1 has a length of 8 octets, the MAC-d PDU Length Indicator information element for PDU #1 may store a value indicating 8 octets.

Payload 745 may include one or more PDUs 746, a New Information Element (IE) Flags information element 717, a Delay Reference Time (DRT) information element 718, a Spare Extension information element 719, and a Payload CRC information element 720. In other embodiments, payload 745 may include additional and/or different information elements than depicted in FIG. 7D.

In payload 745, each PDU may be placed in its original order to avoid reordering. The order of the PDUs may correspond to the order of MAC-d PDU Length Indicators 742 in header 740. New Information Element Flags information element 717, Delay Reference Time information element 718, Spare Extension information element 719, and Payload CRC information element 720 may include information similar to that described above with respect to FIG. 7A.

Figure 7E:
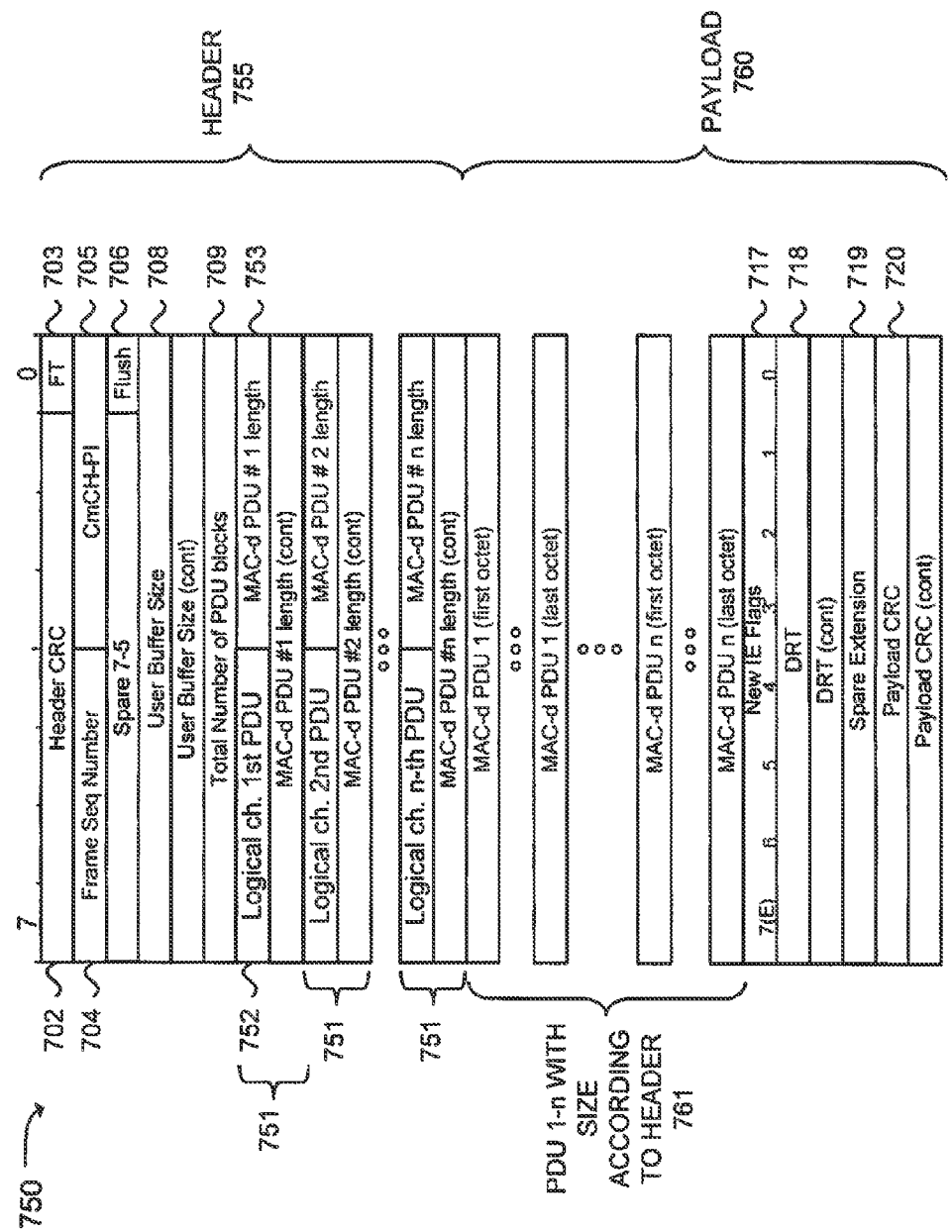

In some embodiments, the logical channel identifier may be the same for an entire HS-DSCH framing protocol type 2 DATA FRAME, such as DATA FRAME 700 in FIG. 7A. In other embodiments, a particular HS-DSCH framing protocol type 2 DATA FRAME may be associated with more than one logical channel identifier. FIG. 7E is an exemplary diagram of a HS-DSCH framing protocol type 2 DATA FRAME 750 that is associated with more than one logical channel identifier. As shown, header 755 of HS-DSCH framing protocol type 2 DATA FRAME 750 may include a Header Cyclic Redundancy Checksum (CRC) information element 702, a Frame Type (FT) information element 703, a Frame Sequence (Seq.) Number information element 704, a Common Transport Channel Priority Indicator (CmCH-PI) information element 705, a Flush information element 706, a User Buffer Size information element 708, a Total Number of PDU Blocks information element 709, and a number of MAC-d PDU description information elements 751 (e.g., one for each PDU in DATA FRAME 750), where MAC-d PDU description information elements 751 for a particular PDU includes a Logical Channel Identifier for PDU information element 752 and a MAC-d PDU Length Indicator information element 753. In other embodiments, header 755 may include additional and/or different information elements than depicted in FIG. 7E.

Header Cyclic Redundancy Checksum information element 702, Frame Type information element 703, Frame Sequence Number information element 704, Common Transport Channel Priority Indicator information element 705, Flush information element 706, User Buffer Size information element 708, and Total Number of PDU Blocks information element 709 may include information similar to that described above with respect to FIG. 7A. Logical Channel Identifier for PDU information element 752 may store information identifying a logical channel instance for the PDU. In one embodiment, Logical Channel Identifier information element 752 may store, for example, a value between 0 and 15, where the values 0 to 14 may identify Logical channels 1-15, and the value "15" may be reserved for future use. The field length of Logical Channel Identifier information element 752 may be four bits in one exemplary embodiment. MAC-d PDU Length Indicator information element 753 for a PDU may store information representing the length (e.g., in octets) of the corresponding PDU in payload 760. For example, if the PDU #1 has a length of 8 octets, MAC-d PDU Length Indicator information element 753 for PDU #1 may store a value indicating 8 octets.

Payload 760 may include one or more PDUs 761, a New Information Element (IE) Flags information element 717, a Delay Reference Time (DRT) information element 718, a Spare Extension information element 719, and a Payload CRC information element 720. In other embodiments, payload 760 may include additional and/or different information elements than depicted in FIG. 7E.

In payload 760, each PDU may be placed in its original order to avoid reordering. The order of PDUs 716 may correspond to the order of MAC-d PDU Length Indicators 753 in header 755. New Information Element Flags information element 717, Delay Reference Time information element 718, Spare Extension information element 719, and Payload CRC information element 720 may include information similar to that described above with respect to FIG. 7A.

Returning to FIG. 5, radio network controller 124-1 may transfer the HS-DSCH framing protocol type 2 DATA FRAME (e.g., DATA FRAME 700, 730, 735, or 750) to base station 122-1 (block 525). For example, radio network controller 124-1 may transfer the HS-DSCH framing protocol type 2 DATA FRAME to base station 122-1 via Iub interface 420.

Base station 122-1 may receive the HS-DSCH framing protocol type 2 DATA FRAME from radio network controller 124-1 (block 530). For example, base station 122-1 may receive the HS-DSCH framing protocol type 2 DATA FRAME via Iub 240. Base station 122-1 may parse the HS-DSCH framing protocol type 2 DATA FRAME to extract the logical channel identifier(s) from the HS-DSCH framing protocol type 2 DATA FRAME (e.g., from Logical Channel Identifier information element 707 in header 701 of HS-DSCH framing protocol type 2 DATA FRAME 700) and map the extracted logical channel identifier(s) to priority queue identifier(s) (block 535). For example, base station 122-1 may, via, for example, logical channel identifier to priority queue mapper 236, use an extracted logical channel identifier to lookup (e.g., via computer-readable medium 300) an identifier for a priority queue of priority queues 234 for the PDUs of the DATA FRAME. In the situation where the HS-DSCH framing protocol type 2 DATA FRAME includes multiple logical channel identifiers (e.g., DATA FRAME 750 in FIG. 7E), base station 122-1 may perform multiple lookup operations to identify priority queues for the PDUs associated with the logical channel identifiers.

In the prior art, a High Speed Downlink Packet Access (HSDPA) base station maintains a number of priority queues. An instance of a priority queue is initialized when a MAC-d flow is established via Node B Application Part (NBAP) messages. Furthermore, one priority queue may serve several logical channels (or radio bearers). The prior art does not include signaling to the base station to support a mapping of priority queue to the logical channel (or Radio Bearer) that use the HSDPA Radio Link/Radio Bearer for user data transport. The consequence of this is that the priority queue identifier is transported together with the logical channel for each PDU to the user equipment so that the user equipment is able to determine 1) to which logical channel a PDU belongs; and 2) which priority queue was used for the scheduling and reordering. This leads to unnecessarily large overhead over the radio interface.

In stark contrast, in embodiments described herein, the radio network controller may transmit control messages to the base station that provide a mapping between the logical channel and the priority queue. This mapping is already included in the prior art when it comes to signaling between the controlling radio network controller/serving radio network controller (CRNC/SRNC) and the user equipment. By signaling the same mapping to the base station, only identification of the logical channel has to be added to each PDU sent to the user equipment from the base station. The user equipment may then be able to determine the correct priority queue identifier from the logical channel identifier. Thus, overhead in the radio interface may be decreased.

Table 1 shows examples of overhead values relating to an old HS-DSCH DATA FRAME format (i.e., the HS-DSCH framing protocol type 1 DATA FRAME) and a new HS-DSCH DATA FRAME format (i.e., the HS-DSCH framing protocol type 2 DATA FRAME according to the exemplary embodiments described here). The examples assume that the Delay Reference Time information element is not present in the DATA FRAMES. As illustrated, the new HS-DSCH DATA FRAME format saves considerable overhead in every situation (except where a single PDU of 10 octets is sent—in that situation, the overhead would be equal).

TABLE 1

| Example case | Overhead - old format | Overhead - new format |
| --- | --- | --- |
| 10 PDUs of length 42 octets (case of a legacy UE) | 19 octets (7 header, 2 CRC, 10 spare + Pad) | 10 octets (6 header, 1 * 2 block header, 2 CRC) |
| 2 PDUs of 500 octets 1 PDU of 400 octets | 21 octets (2 * 7 header, 2 * 2 CRC, 3 spare + Pad - sent in two frames) | 12 octets (6 header, 2 * 2 block header, 2 CRC) |
| 1 PDU of 10 octets | 10 octets (7 header, 2 CRC, 1 spare + Pad) | 10 octets (6 header, 1 * 2 block header, 2 CRC) |
| 1 PDU of 1500 octets | Not supported | 10 octets (6 header, 1 * 2 block header, 2 CRC) |

Once the priority queue(s) have been identified, base station 122-1 may store the PDUs from the HS-DSCH framing protocol type 2 DATA FRAME into the appropriate priority queue(s) in priority queues 234 for later transmission to a user equipment 110 (block 540).

Returning to block 525, once radio network controller 124-1 sends the HS-DSCH framing protocol type 2 DATA FRAME, radio network controller 124-1 may determine whether unused credits remain from the HS-DSCH framing protocol type 2 CAPACITY ALLOCATION Control Frame (block 545). As indicated above, the MAC-d PDU Credits information element of the HS-DSCH framing protocol type 2 CAPACITY ALLOCATION Control Frame indicates the number of MAC-d PDUs octets that a radio network controller is allowed to transmit during one HS-DSCH interval granted in the HS-DSCH framing protocol type 2 CAPACITY ALLOCATION Control Frame (e.g., in MAC-d PDU Credits information element 630). If the Capacity Allocation Control Frame is valid for more than one interval, the radio network controller may reuse credits that were not used within a certain interval in the subsequent interval.

If radio network controller 124-1 determines that unused credits remain from the HS-DSCH framing protocol type 2 CAPACITY ALLOCATION Control Frame (block 545—YES), radio network controller 124-1 may use the unused credits in the next interval (block 550). In one embodiment, radio network controller 124-1 may use the unused credits in only the next interval (and not intervals beyond the next interval). The ability to use credits, which were not used in a previous interval, in the next interval provides for a stable bitrate. If, on the other hand, radio link controller 124-1 determines that no unused credits remain from the HS-DSCH framing protocol type 2 CAPACITY ALLOCATION Control Frame (block 545—NO), processing may end. For example, processing may return to block 515 with radio network controller 124-1 receiving another HS-DSCH framing protocol type 2 CAPACITY ALLOCATION Control Frame.

Figure 8:
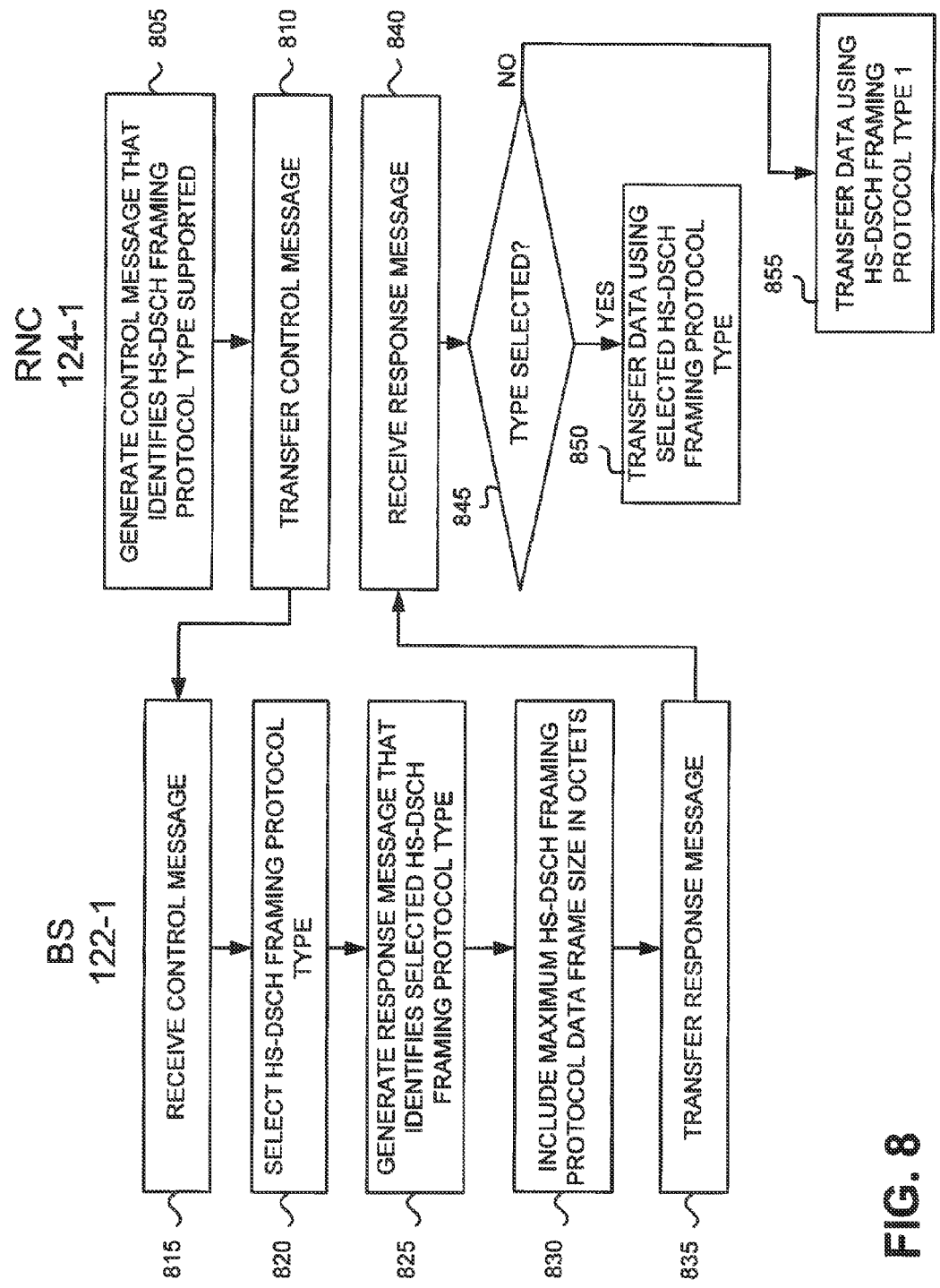
FIG. 8 is a flowchart of an exemplary process for determining whether a node is capable of supporting the HS-DSCH framing protocol type 2 format.

FIG. 8 is a flowchart of an exemplary process for determining whether a node is capable of supporting the HS-DSCH framing protocol type 2 format according to an exemplary embodiment. In one embodiment, portions of the process described in FIG. 8 may be performed by a base station, such as base station 122-1, and a portion of the process may be performed by a radio network controller, such as radio network controller 124-1. In another embodiment, some or all of the exemplary process described below may be performed by another device or combination of devices. For example, the process described below may be performed by first and second radio network controllers.

The exemplary process may begin with radio network controller 124-1 generating a control message that identifies the HS-DSCH framing protocol type supported (block 805). In one embodiment, the control message may include, for example, a RADIO LINK SETUP REQUEST message, a RADIO LINK ADDITION REQUEST message, a RADIO LINK RECONFIGURATION REQUEST message, a RADIO LINK RECONFIGURATION PREPARATION REQUEST message, a PHYSICAL SHARED CHANNEL RECONFIGURATION REQUEST message, and/or another type of control message. In one embodiment, the control message may include a HS-DSCH Framing Protocol Type Support information element in the Information Element HS-DSCH Frequency Division Duplex (FDD) Information. The exemplary coding of the HS-DSCH Framing Protocol Type Support information element is presented in Table 2. As illustrated, the HS-DSCH Framing Protocol Support information element may, in one exemplary embodiment, store an 8-bit Boolean list. Other Boolean list sizes are possible. The HS-DSCH Framing Protocol Support information element may indicate which HS-DSCH framing protocol types are supported. More than one framing protocol type may be supported. From the right to the left of the Boolean list, each position may indicate a HS-DSCH framing protocol type 1 to 8. In one embodiment, a "0" may indicate that the type is not supported and a "1" may indicate the type is supported. For example, a Boolean list of "11000000" may indicate that both type 1 and type 2 framing protocol formats are supported.

TABLE 2

| IE/Group Name | Presence | Range | IE Type and Reference |
|---|---|---|---|
| HS-DSCH Framing Protocol Type Support | | | BOOLEAN LIST (SIZE(8)) |

Radio network controller 124-1 may send the control message to base station 122-1 (block 810). For example, radio network controller 124-1 may send the control message via Iub interface 420. Base station 122-1 may receive the control message (block 815). For example, base station 122-1 may receive the control message via Iub interface 240. Upon receipt of the control message (which includes the HS-DSCH Framing Protocol Type information element), base station 122-1 may select a HS-DSCH framing protocol type (block 820). Base station 122-1 may make the selection based on a number of factors. For example, in one embodiment, base station 122-1 may select the HS-DSCH framing protocol type 2 whenever base station 122-1 is compatible with that framing protocol format. Otherwise, base station 122-1 may select the HS-DSCH framing protocol type 1.

Base station 122-1 may generate a response message that identifies the selected HS-DSCH framing protocol type (block 825). In one embodiment, the response message may include, for example, a RADIO LINK SETUP RESPONSE message, a RADIO LINK ADDITION RESPONSE message, a RADIO LINK RECONFIGURATION RESPONSE message, a RADIO LINK RECONFIGURATION PREPARATION RESPONSE message, a PHYSICAL SHARED CHANNEL RECONFIGURATION RESPONSE message, and/or another type of response message. The type of response message generated may be based on the control message received from radio network controller 124-1. In one embodiment, the response message may include a HS-DSCH Framing Protocol Type Selected information element in the Information Element HS-DSCH Frequency Division Duplex (FDD) Information Response. The exemplary coding of the HS-DSCH Framing Protocol Type Selected information element is presented in Table 3. As illustrated, the HS-DSCH Framing Protocol Selected information element may, in one exemplary embodiment, store an integer (e.g., from 1 to 8) that represents the protocol type number. The HS-DSCH Framing Protocol Selected information element may indicate the HS-DSCH Framing Protocol Type to be used. For example, a value of "1" may indicate that the HS-DSCH framing protocol type 1 has been selected and a value of "2" may indicate that the HS-DSCH framing protocol type 2 has been selected.

TABLE 3

| IE/Group Name | Presence | Range | IE Type and Reference |
|---|---|---|---|
| HS-DSCH Framing Protocol Type Selected | | | INTEGER (1 . . . 8) |

In one embodiment, base station 122-1 may include a HS-DSCH Initial Capacity Allocation information element in the response message. The HS-DSCH Initial Capacity Allocation information element may provide flow control information for each scheduling priority class for the HS-DSCH framing protocol over the Iub interface. The HS-DSCH Initial Capacity Allocation information element may include a Scheduling Indicator information element (which may store information representing the relative priority of the HS-DSCH DATA FRAME), a Maximum MAC-d PDU Size information element (which may store information representing the length (e.g., in bits) of the MAC-d PDU), and a HS-DSCH Initial Window Size information element (which may store information representing the initial number of MAC-d PDUs that may be transmitted by radio network controller 124-1 before new credits are received from base station 122-1). The interpretation of the HS-DSCH Initial Capacity Allocation information element may vary based on the framing protocol type selected. For example, for the framing protocol type 2, the HS-DSCH Initial Capacity Allocation information element may be interpreted by multiplying the maximum MAC-d PDU length (Maximum MAC-d PDU Size) by the number of MAC-d PDUs (HS-DSCH Initial Window Size). This gives a total number of bits (or octets).

In one embodiment, base station 122-1 may include a Maximum HS-DSCH Framing Protocol DATA FRAME Length information element in the Information Element HS-DSCH Frequency Division Duplex (FDD) Information Response (block 830). The exemplary coding of the HS-DSCH Framing Protocol DATA FRAME Length information element is presented in Table 4. As illustrated, the HS-DSCH Framing Protocol DATA FRAME Length information element may, in one exemplary embodiment, store an integer (e.g., from 1 to 5,000 or higher) that represents the maximum HS-DSCH Framing Protocol DATA FRAME length in octets. In practice, when radio network controller 124-1 has a receiving Framing Protocol Maximum Transmission Unit that has a length that is equal to the maximum length in the HS-DSCH Framing Protocol DATA FRAME Length information element, radio network controller 124-1 may take its own Framing Protocol Maximum Transmission Unit into account and trigger the Radio Link Control maximum PDU length accordingly. This information element may be applicable to all HS-DSCH framing protocol types.

TABLE 4

| IE/Group Name | Presence | Range | IE Type and Reference |
|---|---|---|---|
| Maximum HS-DSCH Framing Protocol DATA FRAME Length | | | INTEGER (1, . . . , 5000, . . . ) |

Once the response message has been generated, base station 122-1 may send the response message to radio network controller 124-1 (block 835). For example, base station 122-1 may send the control message via Iub interface 240. Radio network controller 124-1 may receive the control message (block 840). For example, radio network controller 124-1 may receive the control message via Iub interface 420. Radio network controller 124-1 may determine whether a framing protocol type has been selected by base station 122-1 (block 845). For example, radio network controller 124-1 may parse the response message to determine whether the response message includes the HS-DSCH Framing Protocol Type Selected information element.

If the HS-DSCH Framing Protocol Type Selected information element is included in the received response message (block 845—YES), radio network controller 124-1 may identify the HS-DSCH framing protocol type selected by base station 122-1 based on that information element. Radio network controller 124-1 may generate HS-DSCH DATA FRAMES to base station 122-1 according to the selected HS-DSCH framing protocol type selected (block 850). For example, if the HS-DSCH Framing Protocol Type Selected information element indicates that base station 122-1 selected the HS-DSCH framing protocol type 2 format, radio network controller 124-1 may generate and send HS-DSCH framing protocol type 2 DATA FRAMES to base station 122-1.

If, on the other hand, the HS-DSCH Framing Protocol Type Selected information element is not included in the received response message (or, for example, no response is received from base station 122-1) (block 845—NO), radio network controller 124-1 may generate and send HS-DSCH DATA FRAMES to base station 122-1 based on a predetermined HS-DSCH framing protocol type (block 855). In one embodiment, the predetermined HS-DSCH framing protocol type may include the HS-DSCH framing protocol type 1 format.

As an alternative to the process described above with respect to FIG. 8, the capabilities of a base station to handle different HS-DSCH framing protocol types may be configured in the radio network controller with which the base station is associated. For example, radio network controller 124-1 may be configured with information identifying the HS-DSCH framing protocol types supported by base stations 122-1 and 122-2. Thus, when, for example, radio network controller 124-1 has PDUs to send to base station 122-1, radio network controller 124-1 may determine whether base station 122-1 is capable of handling the HS-DSCH framing protocol type 2 (e.g., by looking up the information in a memory associated with radio network controller 124-1). When base station 122-1 is capable of handling the HS-DSCH framing protocol type 2, radio network controller 124-1 may generate a HS-DSCH framing protocol type 2 DATA FRAME, as described herein, that includes the PDUs and may transfer the DATA FRAME to base station 122-1.

In one embodiment 900 illustrated in FIG. 9, a serving radio network controller (SRNC) may need to know whether a drift radio network controller (DRNC) supports flexible PDU length (i.e., the HS-DSCH framing protocol type 2 format). This support may differ from cell to cell, as not all base stations associated with the drift radio network controller may support new flexible PDU length DATA FRAMES. The solution for this is to include information about support for flexible PDU length for each cell in a CAPABILITY CONTAINER information element 910 sent from the drift radio network controller to the serving radio network controller. Similarly, for serving radio network controller relocations, an information element may be included in a SOURCE RNC TO TARGET RNC TRANSPARENT CONTAINER that is transmitted from a relocating serving radio network controller to a target radio network controller, which conveys the capability to handle flexible PDU length DATA FRAMES.

The ability to support flexible PDU length DATA FRAMES may also be conveyed to user equipment 110. For example, an information element may be included in a control message to user equipment 110 that indicates whether or not the base station can support flexible PDU length DATA FRAMES. The control message may include, for example, a RADIO BEARER SETUP message, a RADIO BEARER RECONFIGURATION message, a TRANSPORT CHANNEL RECONFIGURATION message, and/or another type of control message.

Thus, as described herein, the HS-DSCH framing protocol type 2 frame formats may provide:
 a maximum MAC-d PDU length of ~1500 octets and octet granularity in MAC-d PDU length is efficiently supported;
 ability to take into account the Maximum Transmission Unit limitation of the used transport network;
 ability to support flexible MAC-d (RLC) PDU lengths;
 ability to support higher High Speed Packet Access (HSPA) Evolution bitrates (e.g., up to ~42 Megabits per second (Mbps));
 small Transport Network Layer overhead (data frame header and control frame length); and
 single data frame and control frame format for Release 7, making for easier expansion in the future.

The HS-DSCH framing protocol type 2 CAPACITY ALLOCATION Control Frame may provide:
 ability to represent octets or bitrate (instead of number of PDUs and Maximum PDU length);
 ability to have a good bitrate granularity; and
 Ability to send large or small PDUs with small latency and not too bursty load on the Transport Network.

The HS-DSCH framing protocol type 2 DATA FRAME may provide:
 ability to support flexible MAC-d PDU lengths;
 small overhead for all cases, e.g. PDUs of different length in the same data frame; and
 small PDUs of the same length.

The embodiments described herein provide an efficient solution for the transport network support for flexible PDU length DATA FRAMES. The HS-DSCH framing protocol type 2 CAPACITY ALLOCATION Control Frame supports larger MAC-d PDU lengths by allowing the reuse of unused credits. The HS-DSCH framing protocol type 2 DATA FRAME allows large MAC-d PDU lengths, and more than one PDU length in the same data frame. Also, the HS-DSCH framing protocol type 2 DATA FRAME allows MAC-d PDUs from several logical channels within one connection. The header overhead and padding for the transport network are kept small for typical usage scenarios.

The new information elements described herein allow improved interoperability between different frame formats without adding new signaling messages. The new interpretation of the HS-DSCH INITIAL CAPACITY ALLOCATION information element supports flexible PDU length DATA FAMES without changing the definition of the information element.

Embodiments described herein provide illustration and description, but is not intended to be exhaustive or to limit the implementations to the precise form disclosed. Modifications and variations are possible in light of the above teachings, or may be acquired from practice of the implementations. For example, while the following description focuses on the Universal Mobile Telecommunications System (UMTS) Terrestrial Radio Access Network (UTRAN) architecture, it will be appreciated that the techniques described herein are equally applicable to other types of architectures, such as the UTRAN flat architecture. In the UTRAN flat architecture, the radio network controller (RNC) and the base station (BS) may be combined into a single RNC/BS node. A gateway device may transfer traffic between the core network and the RNC/BS node via the transport network.

While series of acts have been described with regard to FIGS. 5 and 8, the order of the acts may be modified in other embodiments. Further, non-dependent acts may be performed in parallel.

The exemplary embodiments, as described above, may be implemented in many different forms of software, firmware, and hardware in the implementations illustrated in the figures. The actual software code or specialized control hardware used to implement the exemplary embodiments described herein is not limiting of the present disclosure. Thus, the operation and behavior of the exemplary embodiments were described without reference to the specific software code—it being understood that one would be able to design software and control hardware to implement the exemplary embodiments based on the description herein.

Further, certain portions of the present disclosure may be implemented as "logic" that performs one or more functions. This logic may include hardware, such as an application specific integrated circuit, a field programmable gate array, a processor, or a microprocessor, software, or a combination of hardware and software.

Even though particular combinations of features are recited in the claims and/or disclosed in the specification, these combinations are not intended to limit the present disclosure. In fact, many of these features may be combined in ways not specifically recited in the claims and/or disclosed in the specification.

It should be emphasized that the term "comprises/comprising" when used in the this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the present disclosure unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method performed by a first device in a High Speed Downlink Packet Access environment, the method comprising:
   generating a High Speed Downlink Shared Channel Capacity Allocation control frame that includes a value representing a number of packet data unit octets that a second device is permitted to transmit during a High Speed Downlink Shared Channel interval; and
   transferring the High Speed Downlink Shared Channel Capacity Allocation control frame to the second device.

2. The method of claim 1, wherein the High Speed Downlink Shared Channel Capacity Allocation control frame further includes a first information element that stores a time interval during which the second device is permitted to use the number of packet data unit octets.

3. The method of claim 2, wherein the High Speed Downlink Shared Channel capacity Allocation control frame further includes a second information element that stores a value indicating a number of subsequent intervals during which the second device is permitted to use the number of packet data unit octets.

4. A device comprising:
   a processing circuit configured to generate a High Speed Downlink Shared Channel capacity Allocation control frame that includes a value representing a number of packet data unit octets that a radio network controller is permitted to transmit during a High Speed Downlink Shared Channel interval; and
   an Iub interface configured to transfer the High Speed Downlink Shared Channel Capacity Allocation control frame to the radio network controller.

5. The device of claim 4, wherein the High Speed Downlink Shared Channel Capacity Allocation control frame further includes:
   a first information element that stores a time interval during which the radio network controller is permitted to use the number of packet data unit octets; and
   a second information element that stores a value indicating a number of subsequent intervals during which the radio network controller is permitted to use the number of packet data unit octets.

6. A method performed by a first device in a High Speed Downlink Packet Access environment, the method comprising:
   receiving a High Speed Downlink Shared Channel capacity Allocation control frame from a second device, the High Speed Downlink Shared Channel Capacity Allocation control frame including a first value representing a first number of packet data unit octets that the first device is permitted to transmit during a High Speed Downlink Shared Channel interval;
   generating, in response to receiving the High Speed Downlink Shared Channel Capacity Allocation control frame, a High Speed Downlink Shared Channel data frame that includes a second number of packet data unit octets, the second number being equal to or less than the first number; and
   transferring the High Speed Downlink Shared Channel data frame to the second device in an interval.

7. The method of claim 6, wherein the second number is 20 less than the first number, and wherein the method further comprises reusing unused packet data unit octets in a next interval.

8. The method of claim 7, wherein the High Speed Downlink Shared Channel Capacity Allocation control frame includes an information element that stores a second value indicating a number of subsequent intervals during which the first device is permitted to use the first number of packet data unit octets, and wherein the reusing occurs when the second value is greater than 1.

9. The method of claim 6, wherein the High Speed Downlink Channel data frame includes a plurality of blocks, each block including a group of packet data units, a length of each packet data unit in a first block of the plurality of blocks being different than a length of each packet data unit in a second block of the plurality of blocks.

10. The method of claim 9, wherein the High Speed Downlink Shared Channel data frame includes a packet data unit and a logical channel identifier.

11. The method of claim 6, wherein the High Speed Downlink Shared Channel data frame includes a plurality of packet data units and a plurality of logical channel identifiers.

* * * * *